(12) United States Patent
Oh

(10) Patent No.: US 8,062,742 B2
(45) Date of Patent: Nov. 22, 2011

(54) METHOD FOR MANUFACTURING SILICONE FOAM HAVING AN AIR PERMEABLE STRUCTURE

(76) Inventor: Seoung Kyu Oh, Ramsey, NJ (US)

( * ) Notice: Subject to any disclaimer, the term of this patent is extended or adjusted under 35 U.S.C. 154(b) by 408 days.

(21) Appl. No.: 11/949,632

(22) Filed: Dec. 3, 2007

(65) Prior Publication Data

US 2009/0142573 A1   Jun. 4, 2009

(51) Int. Cl.
*B32B 27/12* (2006.01)
*B05D 1/28* (2006.01)

(52) U.S. Cl. ............ 428/319.3; 428/319.7; 428/319.9; 428/316.6; 428/311.51; 442/370; 427/209; 427/211; 427/487

(58) Field of Classification Search ............ 428/319.3, 428/319.7, 319.9, 316.6, 311.51; 442/370; 427/209, 211, 487
See application file for complete search history.

(56) References Cited

U.S. PATENT DOCUMENTS

| | | | |
|---|---|---|---|
| 3,598,671 A | 8/1971 | Wortman | |
| 3,961,629 A * | 6/1976 | Richter et al. | 604/369 |
| 4,514,455 A | 4/1985 | Hwang | |
| 5,004,643 A | 4/1991 | Caldwell | |
| 5,482,978 A | 1/1996 | Takahashi | |
| 5,658,629 A | 8/1997 | Delcuve et al. | |
| 6,308,344 B1 * | 10/2001 | Spink | 2/458 |
| 6,342,280 B1 * | 1/2002 | Patrick et al. | 428/34.6 |
| 2004/0254275 A1 * | 12/2004 | Fukui et al. | 524/261 |

FOREIGN PATENT DOCUMENTS

| | | |
|---|---|---|
| WO | 03/021774 | 3/2003 |
| WO | 2004/088019 | 10/2004 |

OTHER PUBLICATIONS

Translation of KR 10-0572558, Kim et al., Apr. 24, 2006, 8 pages.*
International Search Report dated Apr. 9, 2009.
Written Opinion dated Apr. 9, 2009.
Sprayed Polyurethane Foam. Canadian Foam Insulation [online] May 7, 2006 [Retrieved from the Internet Jan. 28, 2009 (URL:http://www.foam-insulation.ca/Article8.htm) Section 3.6.4, pp. 1-45.

* cited by examiner

*Primary Examiner* — Hai Vo

(57) ABSTRACT

A method for manufacturing silicone foams that maintains the original air permeable cell structure of an air permeable material including polyester by curing the air permeable material after coating the air permeable material with a silicone solution including a curing agent.

13 Claims, 3 Drawing Sheets

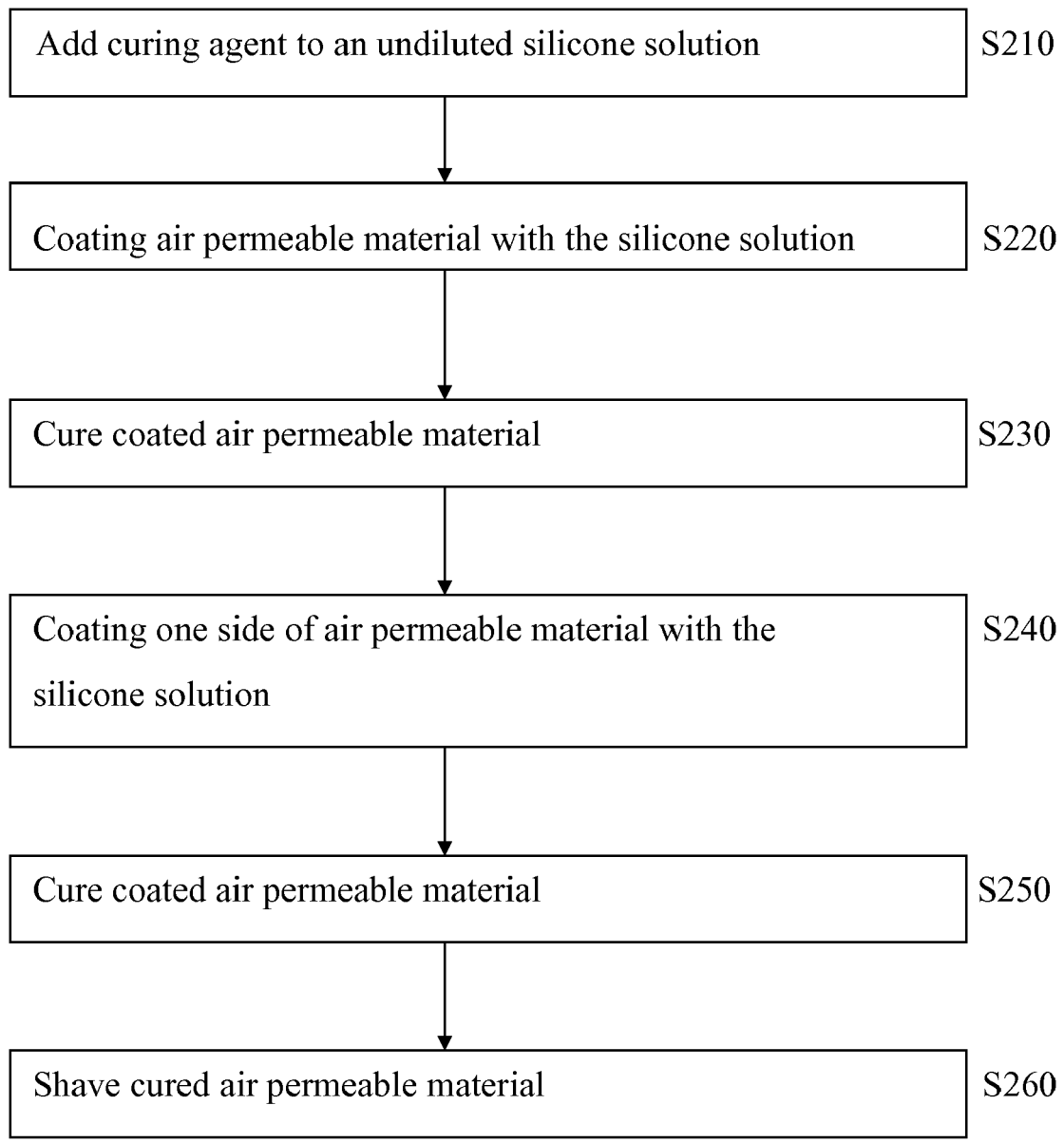

METHOD FOR MANUFACTURING SILICONE FOAM HAVING AN AIR PERMEABLE STRUCTURE

BACKGROUND OF THE INVENTION

1. Field of the Invention

The present invention relates to a method for manufacturing a silicone foam and the silicon rubber molding manufactured by such process. More particularly to a method for manufacturing silicone foams by maintaining a plurality of original air permeable cell structures of an air permeable material, through curing the air permeable material after coating the air permeable material with a silicone liquid mixture compound with a curing agent, which provides an air permeable structure that may have improved heat-resistance and cold-resistance, as well as reduced production costs due to its simple manufacture.

2. Discussion of the Background

Silicone rubber is a synthetic rubber. A main link of which is a coupling of silicone and oxygen. To the contrary, a main link of organic rubber is generally a coupling of carbon and carbon.

Dimethyl silicone rubber may be obtained by performing base-catalyzed or acid-catalyzed ring opening-polymerization of ring-shaped dimethylsiloxane, which may be created through hydrolysis or condensation of dimethyldichlorosilane. Organic peroxide may be used to vulcanize the silicone rubber. When processed, fine powder silica (silicon dioxide) may be added as a reinforcing filler so that the physical character of the vulcanized matter may be considerably improved.

The most distinctive character of silicone rubber is that it can be used over a wide range of temperatures due to its excellent heat-resistance and cold-resistance. Further, silicone rubber may be widely used for industrial goods such as heat-resistant wire covering, heat-resistant oil thread, O-rings, ozone-resistant materials, corona-resistant materials, decomposition-resistant materials, and electric insulation.

Furthermore, because silicone rubber has low toxicity, it may be widely used in bottle caps for medical supplies, medical rubber tubes, conveyer belts and rolls for food processing, and packaging.

However, the above silicone rubber molding process is relatively expensive. Also this process maintains closed inner cell structures in the silicone rubber. Therefore, it cannot be easily applied to the area where both temperature-resistance and air permeability are required.

For example, products that require air permeability, such as covers for microphones or the bottom boards of ironing stands (especially for industrial purposes), cannot be easily made by the above silicone rubber molding process.

Nylon flannel padding has been used in pads for use in the dry cleaning industry for years. However, there are several problems associated with the nylon padding. First, it has a tendency to burn quickly. Second, the material flattens over time, which may lead to finishing problems on garments.

Korean Patent No. 10-0572558, which is hereby incorporated by reference, discloses a process in which a polyurethane foam is coated with a silicone solution. When the polyurethane foam with silicone embedded therein is used in pads for use in the dry cleaning industry it provides the material with a high resistance to heat. However, the polyurethane foam may be easily torn when subjected to tension.

Therefore, a material having both improved temperature resistance and durability that is capable of maintaining its initial thickness is needed.

SUMMARY OF THE INVENTION

The present invention provides a method for manufacturing silicone foams including maintaining an original air permeable cell structure of an air permeable material.

The present invention also provides an air permeable structure applicable in fields requiring air permeability that has excellent heat-resistance and cold-resistance, like in case of silicone rubber molding, and also may be able to cut down production cost due to its simple manufacture.

The present invention also provides material that may be used in pads for the dry clean industry and has superior temperature resistance and durability.

Additional features of the invention will be set forth in the description which follows, and in part will be apparent from the description, or may be learned by practice of the invention.

The present invention discloses a method for manufacturing a silicone foam having an air permeable structure including adding a curing agent to an undiluted silicone solution to form a silicone solution, coating an air permeable material including polyester with the silicone solution, and curing the coated air permeable material.

The present invention also discloses an air permeable structure including a base material having an open cell structure and a coating disposed on the base material. The original open cell structure of the polyester base material is maintained after the coating is disposed on the base material.

The present invention also discloses a method for manufacturing a silicone foam having an air permeable structure including adding a curing agent to an undiluted silicone solution to form a silicone solution, coating an air permeable material including polyester with the silicone solution, curing the coated air permeable material, coating one side of the air permeable material, and curing the coated air permeable material It is to be understood that both the foregoing general description and the following detailed description are exemplary and explanatory and are intended to provide further explanation of the invention as claimed.

BRIEF DESCRIPTION OF THE DRAWINGS

FIG. 4 shows a method for manufacturing silicone foams having an air permeable structure according to another exemplary embodiment of the present invention.

DETAILED DESCRIPTION OF THE ILLUSTRATED EMBODIMENTS

Figure 1:
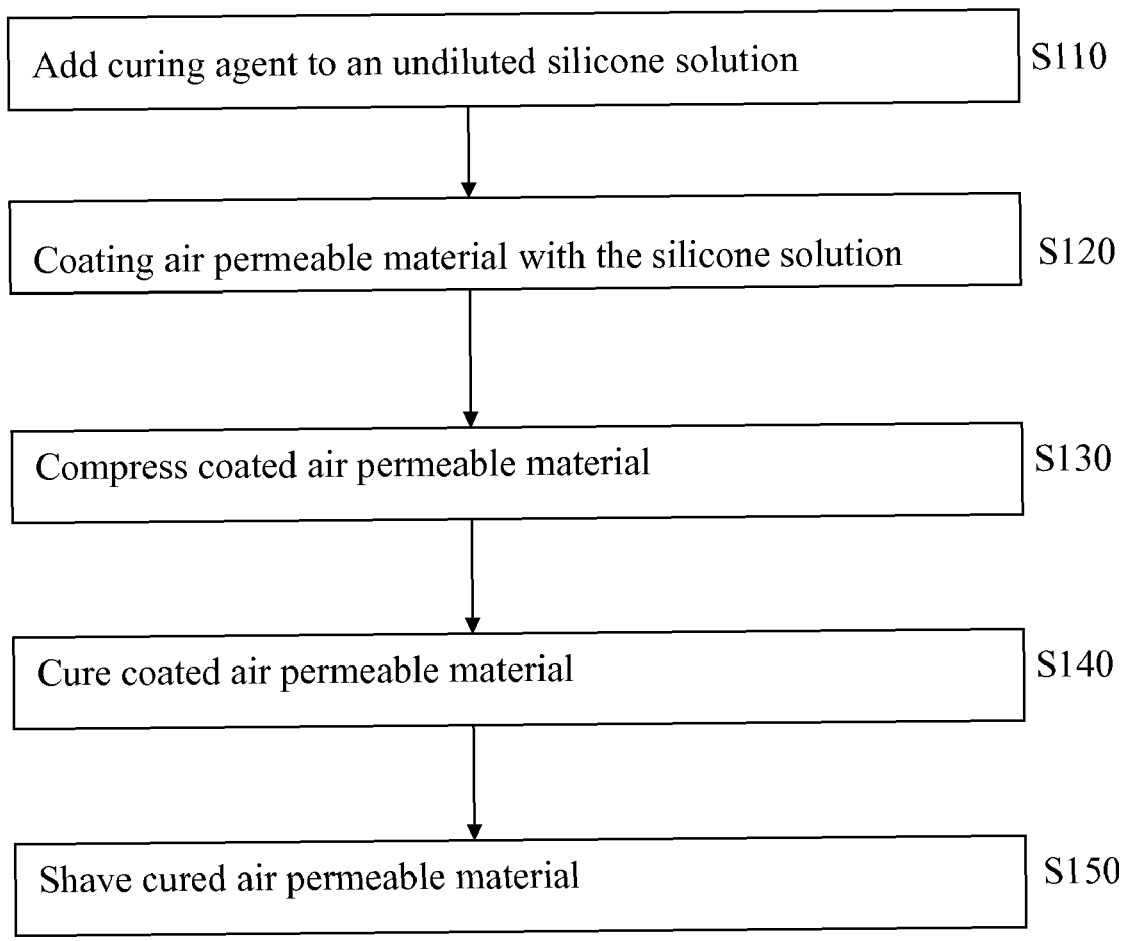
FIG. 1 shows a method for manufacturing silicone foams having an air permeable structure according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

FIG. 1 shows a method for manufacturing silicone foams having an air permeable structure according to an exemplary embodiment of the present invention.

As shown, a method for manufacturing silicone foams having an air permeable structure according to the present invention includes adding a curing agent to an undiluted silicone solution (S110), coating an air permeable material with the resulting silicone solution (S120), and curing the air permeable material (S140). When a curing agent is added to the undiluted silicone solution (S110), the elasticity, that is, the cushion difference of molded silicone foams, is proportional to the mixture ratio of the curing agent. The greater the amount of curing agent added, the weaker the elastic strength becomes. The curing agent may be platinum catalyst and may be added at a concentration of about 0.01% through 0.2% by weight.

The undiluted silicone solution may include heat-conductive silicone rubber foams. The viscosity of the undiluted silicone solution may be 10,000-15,000 cP. For example, the undiluted silicone solution may include 50-70 parts by weight of dimethylvinylpolydimethylsiloxane. The undiluted silicone solution may further include polymethylsiloxane, platinum catalyst, heat-conductive alumina filler, and graphite. The graphite may be present at a concentration of 100-200 parts by weight, and the particle size of the alumina filler may be less than or equal to 10 μm.

Alternatively, the undiluted silicone solution may include magnetic silicone. For example, the undiluted silicone solution may include magnetic heat-conductive silicone foams composed of (i) magnetic silicone having 30-60 parts by weight of dimethylsiloxane isolated by dimethylvinylsiloxane group, 5-15 parts by weight of dimethylhidrogensiloxane polymer, less than 10 parts by weight of 1-Tetradencene, and 0.001-0.9 parts by weight of platinum catalyst, (ii) 100-200 parts by weight of heat-conductive alumina filler not bigger than 10 μm, and (iii) 20-30 parts by weight of graphite.

In other exemplary embodiments of the present invention, an undiluted urethane solution or an undiluted rubber solution may be employed in place of the undiluted silicone solution.

When the air permeable material is coated with the silicone solution, which includes the undiluted silicone solution and the curing agent, the silicone solution permeates the air permeable material, but the air permeable cells in the air permeable material may be maintained. That is, the inner structure native to the air permeable material is maintained and hardened. Thus, the air permeable material remains air permeable. For example, silicone solution may be coated onto the air permeable material at a density of 2.7 kg/m².

One side of the air permeable material may be coated with a higher density of the silicone solution than the other side of the air permeable material. For example, the density of the silicone solution of one side of the air permeable material may be about 10-30% higher than that of the other side of the air permeable material. The portion of the air permeable material that is more densely coated may make up 10-30% of the thickness of the entire air permeable material.

The air permeable material may be, for example, a sponge. The air permeable material may include a non-woven fabric or filter having an air permeable structure. For example, the air permeable material may include polyester or may consist entirely of polyester. The air permeable material may be needle-punched such that it has an open cell structure, and may be surface-treated prior to needle-punching in order to provide a more uniform material. The air permeable material may have a density of 15-20 kg/m², may have a cell size of 10-40 ppi, and may have a thickness of 5-50 mm. The exemplary embodiment started to process the air permeable material with a thickness of 12 mm.

Further, when a large quantity of silicone solution is introduced into the above air permeable material, the air permeability may decrease. However, the introduction of a small quantity of the silicone solution in the air permeable material may improve air permeability.

After the air permeable material coated with the silicone solution (S120), it is cured at a predetermined temperature for a predetermined time (S140). The curing temperature may be about 80° C.-200° C. and the curing time may be about 1-30 minutes.

For example, to cure a sponge having a thickness of 5 cm, a width of 1 m, and a length of 1 m, the sponge may be heated to about 100° C. for about 5 minutes. The above heating temperature and time may change depending on the specific curing agent employed.

The air permeable material may be compressed (S130) after it is coated with the silicone solution (S120) and prior to curing (S140).

For example, the air permeable material may be compressed through a roller to adjust the amount of the silicone mixture solution present in the air permeable material.

One side of the air permeable material may be shaved out to achieve smoother surface depending on what air permeable material was used (S150). In our exemplary embodiment, one surface of the polyester fiber with 12 mm thickness was shaved out to render 10 mm thickness of final coated air permeable material. In such a case, the surface to be shaved out may be coated with silicone with higher density or coated one more time than the other side.

The finished air permeable material may be cut to a predetermined size.

Hereinafter, the manufacturing process according to the present invention will be described with reference to the FIG. 2 and FIG. 3 in detail.

Figure 2:
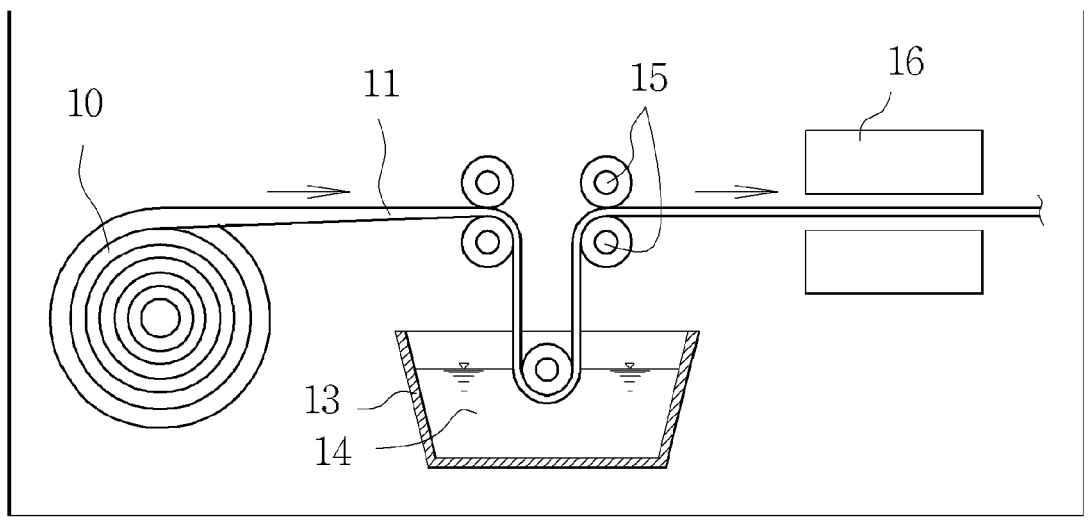
FIG. 2 shows a method for manufacturing silicone foams having an air permeable structure according to an exemplary embodiment of the present invention.

Firstly, as shown in FIG. 2, a sheet of air permeable material 11 from a roll of air permeable material 10 is immersed in a raw material tank 13 filled with a silicone solution 14 through the use of rollers 15. The sheet of air permeable material 11 is transported by the rollers 15 to a heating device 16, which may be an oven, where it is cured. In the exemplary embodiment, the air permeable material 11 may be polyester fiber. The curing temperature may be about 80° C.-200° C., and the curing time may be about 1-30 minutes. For example, the air permeable material 11 may be cured at 100-160° C. for 3-15 minutes.

Here, the amount of silicone mixture that permeates into the air permeable material may be adjusted by controlling the compression degree of the rollers 15. One side of the air permeable material 11 may be coated with a higher density of the silicone solution than the other side of the air permeable material 11. For example, the density of the silicone solution 14 of one side of the air permeable material 11 may be about 20% more than that of the other side of the air permeable material 11. The portion of the air permeable material 11 that is more densely coated may make up 20-30% of the thickness of the entire air permeable material 11.

Figure 3:
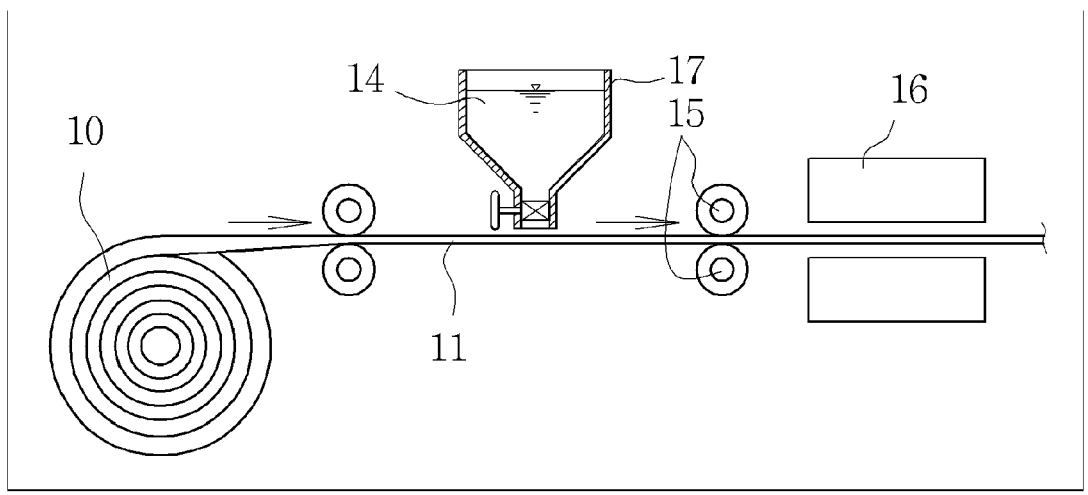
FIG. 3 shows a method for manufacturing silicone foams having an air permeable structure according to another exemplary embodiment the present invention.

In FIG. 3, which shows an alternative to the method shown in FIG. 2, a sheet of air permeable material 11 from a roll of air permeable material 10 is transported by the rollers 15 and passes under a raw material control tank 17 filled with silicone solution 14, which disperses silicone solution 14 onto the sheet of air permeable material 11. About 500-5,000 g of silicone solution 14 may be dispersed per square meter of air permeable material 11. In the exemplary embodiment, 2.7 kg/m$^2$ of silicone solution may be dispersed onto the air permeable material 11.

The sheet of air permeable material 11 is transported through the rollers 15 to a heating device 16 where it is cured. The curing temperature may be about 80° C.-200° C. and the curing time may be about 1-30 minutes. More specifically, the air permeable material 11 may be cured at 100-160° C. for 3-30 minutes. For example, when silicone solution 14 is dispersed at a rate of 2,000 g/m$^2$, the air permeable material 11 may be cured at 160° C. for 15 minutes.

The method of FIG. 3 allows the amount of silicone solution 14 dispersed from the raw material control tank 17 to be controlled, thereby controlling the amount of silicone solution 14 permeating into the sheet of air permeable material 11. The side of the air permeable material 11 onto which the silicon solution 14 is dispersed may be coated with a higher density of the silicone solution 14 than the other side of the air permeable material 11. For example, the density of the silicone solution 14 of one side of the air permeable material 11 may be about 10-30% more than that of the other side of the air permeable material 11. The portion of the air permeable material 11 that is more densely coated may make up 10-30% of the thickness of the entire air permeable material 11.

The methods of FIG. 2 and FIG. 3 are continuous manufacturing methods that may be realized using the roll of air permeable material. However, even though not shown in the FIG. 2 and FIG. 3, the air permeable material may be provided in a different form, i.e., it may be cut to a predetermined size using mimeography, and heated to cure through a separate heating device.

After curing, one side of the cured air permeable material may be shaved out to achieve a smooth surface. For example, if the air permeable material is initially 12 mm thick, it may be shaved out to be 10 mm thick. If one side of the cured air permeable material is more densely coated with silicone solution, the shaving process may remove a portion of the more densely coated side of the cured air permeable material. After shaving, the side of the air permeable material that was not shaved may contain fibrous hairs, while the shaved side of the air permeable material may have a smooth surface.

Referring to FIG. 4, a method for manufacturing silicone foams having an air permeable structure according to another exemplary embodiment of the present invention includes a adding a curing agent to an undiluted silicone solution (S210), coating an air permeable material with the resulting silicone solution (S220), and curing the air permeable material (S230). The method may further include re-coating one side of the cured permeable material (S240), curing the air permeable material (S250), and shaving the air permeable material (S260).

For example, the air permeable material may initially be coated evenly, and cured. Thereafter, the air permeable material may pass under a raw material control tank containing silicone solution, which is then dispersed onto one side of the air permeable material. The air permeable material may be passed to a heating device where it is cured, after which it may be shaved to achieve a smooth surface.

The side of the air permeable material that is coated a second time may have a higher density of the silicone solution than the other side of the air permeable material. For example, the density of the silicone solution of the twice-coated side of the air permeable material may be about 10-30% more than that of the other side of the air permeable material. The portion of the air permeable material that is twice-coated may make up 10-30% of the thickness of the entire air permeable material.

As described above, exemplary embodiments of the present invention provide a method for manufacturing silicone foams that maintains the original air permeable cell structure of an air permeable material, by curing the air permeable material after coating the air permeable material with a silicone solution including a curing agent, thereby providing an air permeable structure that may have good heat-resistance and cold-resistance and reduced production cost due to its simple manufacture.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for manufacturing an air permeable structure, comprising:
    adding a curing agent to an undiluted silicone solution to form a silicone solution;
    coating a non-woven polyester base material with the silicone solution, wherein the polyester base material comprises an open cell structure and a thickness ranging from 5 to 50 mm; and the silicone coating disposed on the cells of the open cell structure and both surfaces of the polyester base material, wherein the original open cell structure of the polyester base material is maintained after the silicone coating is disposed on the polyester base material,
    curing the coated polyester base material,
    wherein a first side of the air permeable structure is more densely coated than a second opposite side of the air permeable structure, the coating on the first side of the air permeable structure having a thickness ranging from 10 to 30% of the thickness of the entire air permeable structure.

2. The method of claim 1, wherein curing the coated polyester base material comprises heating the air permeable material to a temperature in the range of 80° C.-200° C. for a time in the range of 1-30 minutes.

3. The method of claim 1, further comprising:
    compressing the coated polyester base material prior to curing coated polyester material air permeable material.

4. The method of claim 1 further comprising:
    shaving one of the first side and the second side of the air permeable material to achieve a smooth surface.

5. The method of claim 1, wherein the density of silicon solution coated on the first side of the air permeable material is 10-30% greater than the density of silicon solution coated on the second opposite side of the air permeable material.

6. The method of claim 1, wherein the polyester base material is coated with 2.0-3.0 kg/m.sup.2 of silicone solution.

7. An air permeable structure, comprising:
    a non-woven polyester base material comprising an open cell structure, wherein the of ester base material com rises a thickness ran in from 5 to 50 mm; and
    a coating disposed on the cells of the open cell structure and both surfaces of the polyester base material,
    wherein the original open cell structure of the polyester base material is maintained after the coating is disposed on the polyester base material, and the coating comprises a silicone compound, and wherein a first side of the air permeable structure is more densely coated than a second opposite side of the air permeable structure, the coating on the first side of the air permeable structure having a thickness ranging from 10 to 30% of the thickness of the entire air permeable structure.

8. The air permeable structure of claim 7, wherein the polyester base material comprises a density ranging from 15 to 20 kg/m$^2$.

9. The air permeable structure of claim 7, wherein cells of the open cell structure have a size of 10-40 pores per inch (ppi).

10. The air permeable structure of claim 7, wherein the coating comprises a heat-conductive silicone rubber foam.

11. The air permeable structure of claim 7, wherein the coating comprises a magnetic heat-conductive silicone foam.

12. The air permeable structure of claim 7, wherein the density of the silicon solution of the coating on one side of the polyester base material comprises a range of 10 to 30% greater than that of the opposite side of the air permeable structure.

13. The air permeable structure of claim 7, wherein the air permeable structure is temperature resistant.

* * * * *